J. R. MENDENHALL.
WAVE MOTOR.
APPLICATION FILED MAY 9, 1912.
1,098,517.
Patented June 2, 1914.
2 SHEETS—SHEET 1.
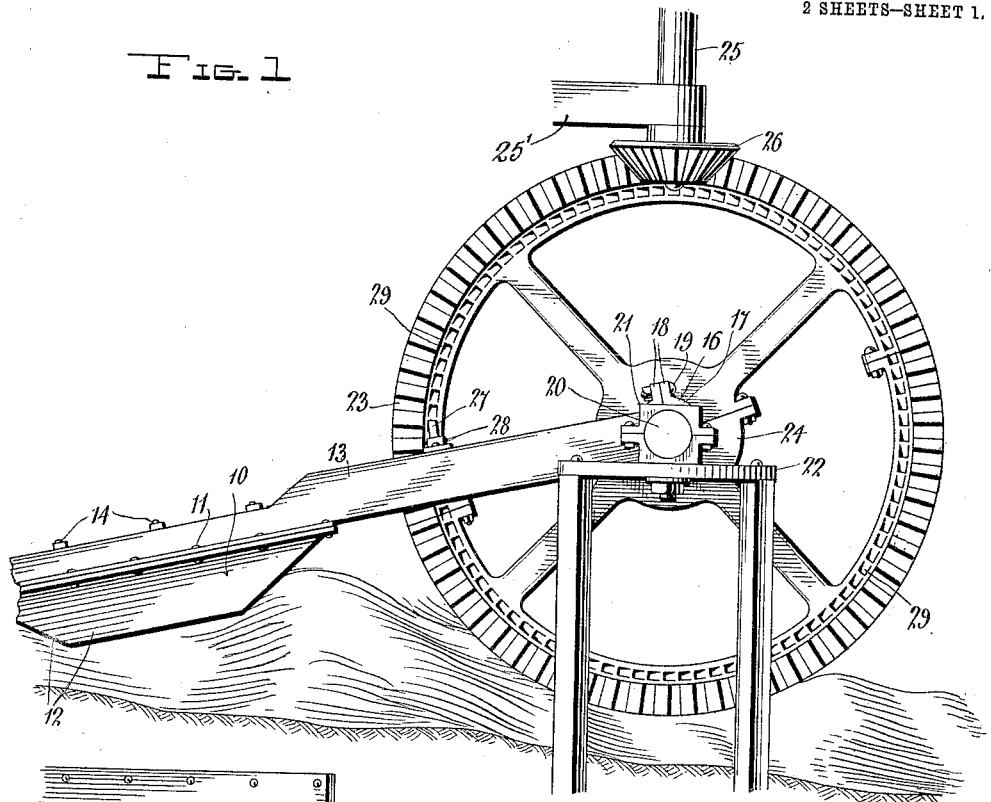
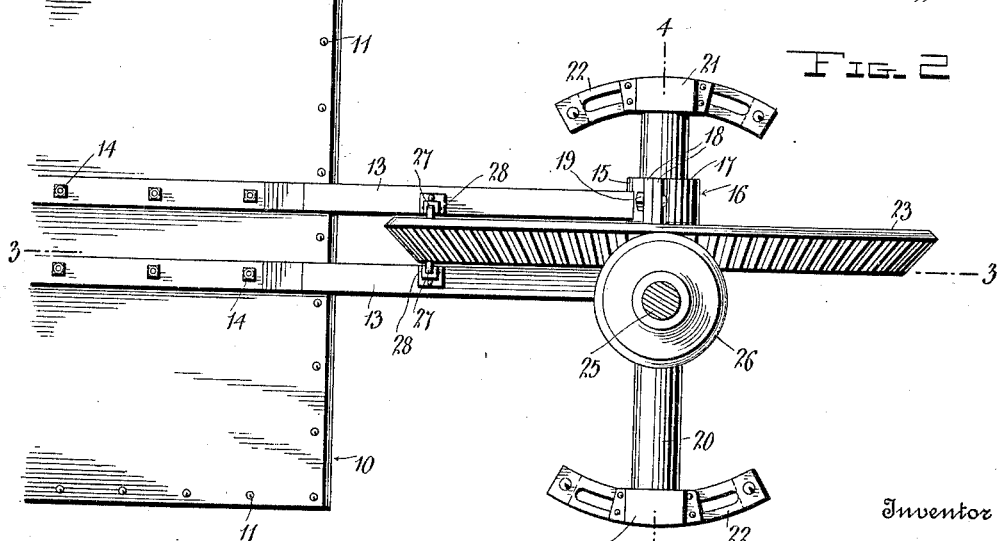
Witnesses
Inventor
J. R. Mendenhall,
By
Attorneys

J. R. MENDENHALL.
WAVE MOTOR.
APPLICATION FILED MAY 9, 1912.
1,098,517.
Patented June 2, 1914.
2 SHEETS—SHEET 2.
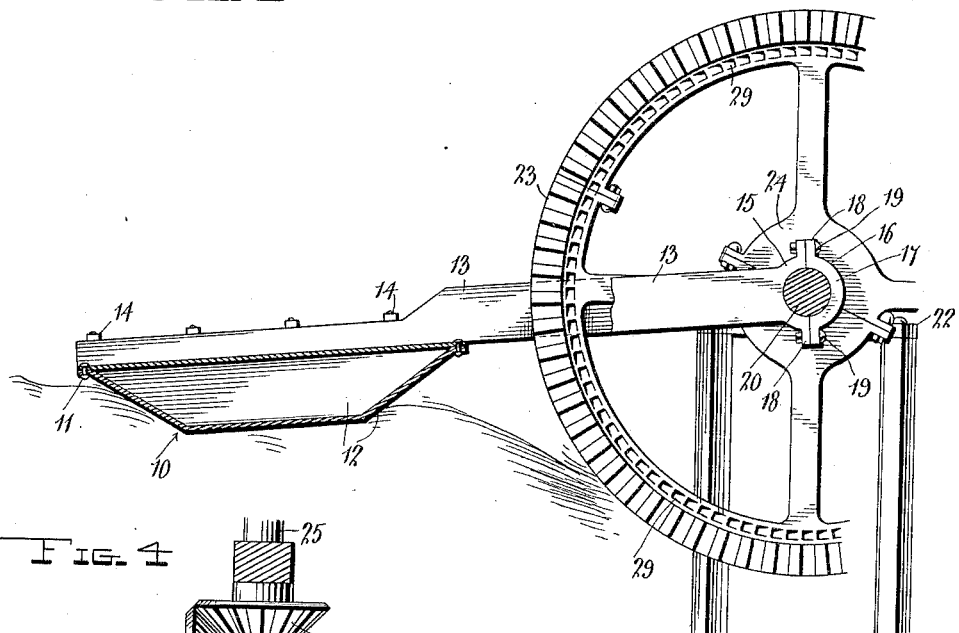
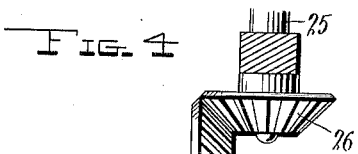
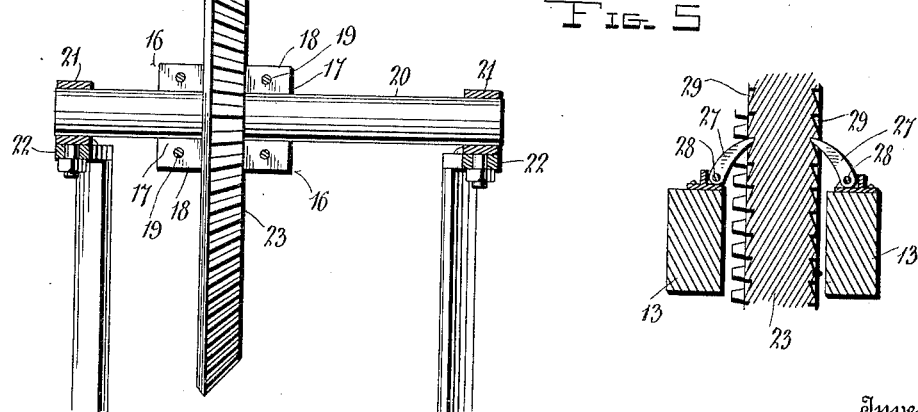
Witnesses
Inventor
J. R. Mendenhall,
By
Attorneys

UNITED STATES PATENT OFFICE.

JOHN R. MENDENHALL, OF SEARCHLIGHT, NEVADA.

WAVE-MOTOR.

1,098,517.　　　　Specification of Letters Patent.　　Patented June 2, 1914.

Application filed May 9, 1912.　Serial No. 696,226.

*To all whom it may concern:*

Be it known that I, JOHN R. MENDENHALL, a citizen of the United States, residing at Searchlight, in the county of Clark, State of Nevada, have invented certain new and useful Improvements in Wave-Motors; and I do hereby declare the following to be a full, clear, and exact description of the invention, such as will enable others skilled in the art to which it appertains to make and use the same.

This invention relates to new and useful improvements in wave motors, the object of the invention being to utilize the force of waves for operating the machinery mainly through rotation imparted to a shaft.

The primary object of this invention is to provide a wave motor of simple and durable structure involving a float operated shaft, motion being imparted thereto by raising of the float which moves independent of the shaft in falling and in which said float is capable of rotation to swing with any side motion of the water and thus greatly lengthen the life of the device.

With the above and other objects in view, the invention consists of certain other combinations and arrangements of parts as will be hereinafter more fully described, claimed and illustrated in the accompanying drawings, in which:

Figure 1 is a side elevation of my improved wave motor. Fig. 2 is a top plan view thereof. Fig. 3 is a sectional view on the line 3—3 of Fig. 2. Fig. 4 is a sectional view taken on the line 4—4 of Fig. 2. Fig. 5 is a detail sectional view of the pawl and ratchet mechanism.

As shown, my improved wave motor comprises a float 10 of suitable size and preferably formed of sheet metal sections riveted together as shown at 11, the said float being so constructed as to be properly actuated so as to rise and fall by the force of the waves and being for this purpose, preferably of rectangular form in plan view but having downwardly and inwardly sloping side portions 12 forming substantially an inverted pyramid. A pair of spaced parallel arms 13 have their free ends bolted to the top of the float as shown at 14 and the inner ends of the arms are increased in size and formed with enlarged semi-circular bearing members 15.

Adapted to coact with the bearing members 15 to form a split boxing 16 at the inner end of each arm are semi-circular bearing plates 17, both of the members 15 and 17 having abutting flanges 18 transversely thereof and which are bolted together as shown at 19. The boxings thus formed are held against movement and are rigidly engaged on a horizontal supporting shaft 20 which is journaled at its ends in bearing boxes 21 arranged for movement in a circular path upon arcuate tracks 22 concentrically arranged relative to the center of said shaft. The tracks 22 may be supported in a rigid position in any convenient manner and at a proper distance above the water line for the passage of the water therebetween. Also rotatably mounted on the shaft 20 is a large two-piece gear wheel 23, the same being held against displacement or longitudinal movement on the shaft 20 at one side of the longitudinal center of the latter between the arms 13 where the latter are clamped rigid to the shaft through the medium of the boxings 16 and against which latter the opposite faces of the hub portion 24 of the gear wheel 23 is movable, the coacting faces being properly lubricated to insure free rotation of the gear wheel.

A driven shaft 25 is rotatably supported in a vertical position in a horizontal bearing 25' as shown and depends to a point centrally of the longitudinal extent of the shaft 20 and a small beveled gear wheel 26 is rigidly mounted on the lower end of the shaft 25 for engagement with the gear wheel 23 whereby motion imparted to the gear wheel 23 in a manner to be hereinafter made apparent will rotate the shaft 25 through the intermeshed gear 26 and the momentum of the larger gear wheel and a suitable fly wheel mounted on a counter shaft not shown will cause continuous driving action.

In order to impart rotation to the gear wheel 23, the inner faces of both of the arms 13 are provided with catch members or pawls 27 which are pivoted to the arms as shown at 28 and extend upwardly for engagement with opposed series of notches 29 formed continuously in opposite side faces of the gear 23 so that rising of the float 10 on the waves causes the pawls 27 to engage in the notches 29 and upon upward movement of the pawls, to rotate or turn the large gear wheel 23 upon the shaft 20 and in turn, to cause rotation of the shaft 25 through the intermeshed gear 26. During the downward motion of the float, the pawls 27 will ride over the notches and thus permit the large gear wheel to continue to rotate or revolve in the direction started by the rising of the float and to be continuously rotated by the movements of the float and thereby utilizing the force of the waves for running any desired machinery.

From the foregoing description in connection with the accompanying drawings it will be seen that I have provided a very efficient wave motor and one which by reason of its simple construction will utilize the maximum amount of force of the waves without undue lost motion and it will be further evident that by reason of mounting the supporting shaft in bearings movable upon circular tracks arranged in a common circular path and by disposing the gear wheel 26 centrally between the tracks or in the center of the circular side swing thereof, said gear will be in the same relative position to the large gear wheel at all times and thus the parts can rotate during any side motion of the float.

I claim:

In a wave motor, the combination with a pair of arcuate longitudinally slotted tracks arranged at opposite points in the circumference of a common circle, of supports for said tracks adapted to space the tracks above the surface of the water, a shaft, bearings on the ends of said shaft, said bearings journaling said shaft for rotation and further having depending guides disposed in the slots of said tracks whereby said shaft is mounted for horizontal movement in a circular path on said tracks, a gear loose on said shaft and having ratchet teeth in the opposite sides, a float having parallel straight arms passing on opposite sides of said gear and fixed to said shaft and serving to oscillate said shaft during rise and fall of the float under the action of the waves, pivoted up-standing hook-like pawls carried by the arms engageable with the ratchet teeth of said gear for rotating said gear step by step during the rise and fall of said float, and a driven shaft having a pinion meshing with said gear.

In testimony whereof, I affix my signature, in presence of two witnesses.

JOHN R. MENDENHALL.

Witnesses:
WALTER R. GROFF,
LOUIS W. GODIN.

---

Copies of this patent may be obtained for five cents each, by addressing the "Commissioner of Patents, Washington, D. C."